United States Patent [19]

Hormel et al.

[11] Patent Number: 4,550,261
[45] Date of Patent: Oct. 29, 1985

[54] FLUID LEVEL SENSOR CIRCUITRY

[75] Inventors: Ronald F. Hormel, Mt. Clemens; Frederick O. R. Miesterfeld, Troy, both of Mich.

[73] Assignee: Chrysler Corporation, Highland Park, Mich.

[21] Appl. No.: 533,181

[22] Filed: Sep. 19, 1983

[51] Int. Cl.⁴ .................. G01F 23/22; H01H 47/32
[52] U.S. Cl. .................. 307/118; 73/304 R; 361/178
[58] Field of Search .............. 73/291, 295; 340/622, 340/620, 59; 374/142; 361/178; 307/118

[56] References Cited

U.S. PATENT DOCUMENTS

| | | | |
|---|---|---|---|
| 3,790,936 | 2/1974 | Knoll | 340/620 X |
| 3,792,456 | 2/1974 | Hill | 340/59 X |
| 4,065,760 | 12/1977 | Feldon | 340/622 |
| 4,086,538 | 4/1978 | Foreman | 307/362 X |
| 4,326,199 | 4/1982 | Tarpley et al. | 340/622 |
| 4,464,582 | 8/1984 | Aragaki et al. | 307/118 |
| 4,475,140 | 10/1984 | Day | 361/178 X |
| 4,491,146 | 1/1985 | Sveds | 307/118 X |
| 4,503,419 | 3/1985 | Kidd et al. | 340/620 X |

OTHER PUBLICATIONS

PCT No. "WO83/00785" Published Mar. 3, 1983, Applicant Motorola Inc., Inventor Barker et al., High Speed Comparator CMOS Circuit.

Primary Examiner—Daniel M. Yasich
Attorney, Agent, or Firm—Mark P. Calcaterra

[57] ABSTRACT

A device to control a temperature variable-resistive type oil fluid level sensor in vehicles. The device employs constant current excitation under control of a relay to maximize the sensor's response and employs a shut-off feature to protect the sensor from overheating.

4 Claims, 1 Drawing Figure

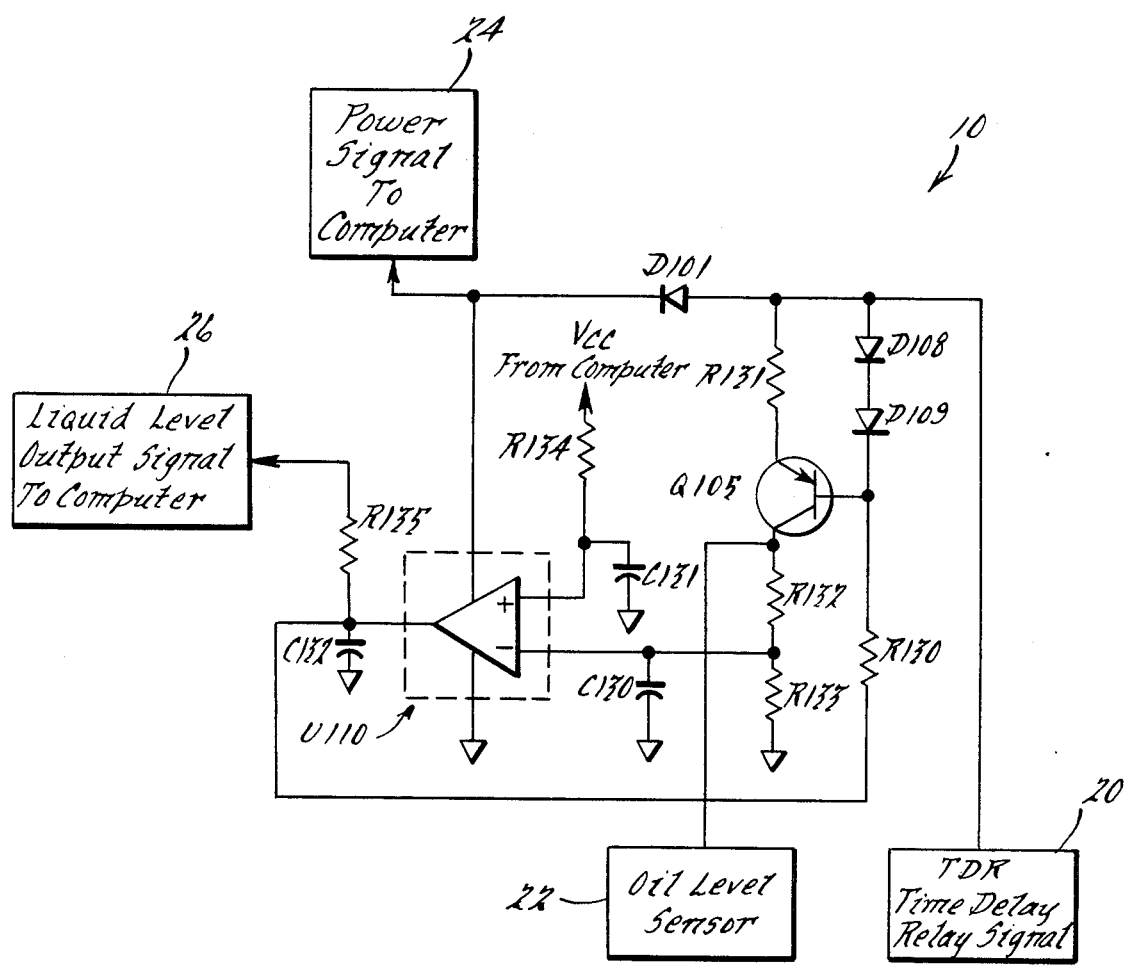

FLUID LEVEL SENSOR CIRCUITRY

BACKGROUND AND SUMMARY OF THE INVENTION

This invention relates to a circuit control means to work with a thermal resistive type fluid level sensor. Although a thermistor type sensor could be used, the preferred embodiment uses a liquid level sensor which employs semiconductive material which, over a temperature range, exhibits a peak electrical resistance at a predetermined temperature and predetermined varying resistance over the rest of the temperature range. Such a device is further described in U.S. Pat. No. 4,065,760.

The subject invention is employed in an automotive engine environment to detect the level of engine oil. The invention provides for constant current excitation to the liquid level sensor. The constant current excitation is shut off under a no-oil condition thereby providing a no-oil signal to some type of message center while also protecting the oil level sensor from damage under this high temperature self-heat condition. Another advantage of utilizing the constant current excitation is that the response from the oil level sensor is very quick because maximum power can be delivered to the sensor.

If constant voltage excitation were utilized, a resistor would be placed in series with the sensor to limit the current drawn to that value of the sensor's maximum allowable power. The sensor exhibits peak resistance at a mid-range temperature value and exhibits minimal resistance at both low and high temperature values. Under a constant voltage excitation condition, the sensor, when operating at low temperatures, cannot heat up quickly enough to respond properly; this is due to the current limiting, resistive-drive excitation. The current draw at low temperatures will not sufficiently heat up the sensor by self-heating. At high temperatures when the sensor is excited with constant voltage, the current through the sensor is greater due to the device's decreased resistance at high temperatures. Therefore, the high temperature current rating limits the amount of current that you can safely source through the device with a limiting resistor. This limits the sensor, at lower temperatures where the device exhibits higher resistance, to a lower current draw than required for proper self-heating action and response.

If you drive the sensor with a constant current device, you can dissipate more power within the device and therefore operate it faster. With constant current excitation, a current value is selected to operate the sensor near the high temperature power limit at all times (with appropriate automatic over-temperature protection). This condition provides for the quick response from the sensor required (it is estimated that the response is in order of magnitude better than with constant voltage excitation). Constant current excitation also minimizes the effects of the voltage fluctuations typically experienced in automotive applications.

BRIEF DESCRIPTION OF THE DRAWING

The FIGURE is a schematic diagram showing the oil level sensor circuitry.

DESCRIPTION OF THE PREFERRED EMBODIMENT

The oil level sensor circuit shown in the FIGURE as 10 is turned on when a signal is provided from a source. In this case, the source is a time delay relay (TDR) which generates the signal shown in the FIGURE as 20. The oil level sensor circuit is used in an automobile which is equipped with means to energize a TDR. In the preferred embodiment, the TDR signal 20 is generated from a TDR which is energized when the driver's door to the automobile is opened. The signal from 20 is fed through to the oil level sensor circuit through diode D101 that turns on the microprocessor or computer with a power signal 24. The circuit excites the oil level sensor 22 and provides for an output signal 26 back to the computer which is essentially an output level reading from comparator U110. If the voltage level from U110 through resistor R135 is a logic level low, this indicates that the oil level is acceptable. If the voltage level is a logic level high, then this indicates that the oil level was unacceptable.

More specifically, the oil level sensor circuit supplies power from the time delay relay signal 20 through two diodes D108 and D109 which are connected in series to the node formed by the base of a transistor Q105 and resistor R130. Resistor 130 provides a feedback path from the output of comparator U110 to Q105. Initially, U110 is in a logic level low state thereby providing a logic level low state to the base of Q105 via the feedback path of resistor R130. The time delay relay signal 20 also provides power to resistor R131, which is connected to the anodes of diode D108 and diode D101, through to the emitter of Q105. Diode D101 blocks current from the computer line 24 such that the TDR signal 20 is the only way to energize the circuit. Since the emitter to base voltage of Q105 is equal approximately to one diode drop and the voltage between the TDR signal 20 and the base of Q105 is equal to two diode drops as provided by D108 and D109, that imposes one diode drop voltage across R131 which stays there as a constant voltage and as a constant resistance. This ultimately provides that a constant current has to be sourced out of the collector of Q105. The resistor R131 is selected such that Q105 will pump out sufficient current to the sensor 22 under the conditions of the minimal voltage expectation from 20 and such that the current output from Q105 will be limited to protect sensor 22 under the conditions of the maximum voltage expectation from 20. Most of the constant current is sourced to the oil level sensor 22.

Resistors R133 and R132 in series constitute a divider network which is connected to the collector of Q105 through to ground and sets a voltage level that is above the voltage level on the plus input to comparator U110. The voltage output from the divider network is at the junction of resistor R132 and R133 and is supplied to the negative input of comparator U110 and to filter capacitor C130. Connected to the plus input of comparator U110 is a voltage reference signal which is provided by means of a regulated voltage supply from the computer shown on the FIGURE as Vcc and a series RC network of resistor R134 and capacitor C131. The junction between the resistor and capacitor is connected to the plus input of U110. The voltage supply Vcc is energized via the TDR signal 20 through a regulator in the computer (not shown). The initial condition capacitor C131 holds the plus input low when the circuit is first energized. The plus input being low guarantees that comparator U110 will have a low output which is fed back as a logic level low state signal to resistor R130 connected to the base of Q105. This low signal turns the constant current source on and holds it on for the initial condition period.

C132 is connected between the output of U110 and ground. It functions during conditions where the voltage on capacitors C131 and C130 are nearly zero. This condition might put U110 into an unstable condition but for the presence of C132 which holds the output low.

If the oil level sensor is in oil, the voltage at the negative input to U110 will stay low and the output will not change. If, on the other hand, the sensor is not immersed in oil, it will get very hot, and impose a low impedance back to the collector of transistor Q105. This will pull down the voltage level on resistors R132 and R133 due to the constant current supplied from Q105. This pull-down action brings the negative input to U110 below the voltage level on the plus input which changes the state of U110; this forces the output of U110 to send a high signal 26 to the computer, indicating a loss of oil. The computer then signals the message center or indicator. The high level output of U110 shuts Q105 and sensor 22 off. Reasistors R132, R133 and R134 are selected such that U110 will change states when the sensor 22 senses a no-oil condition, thereby automatically shutting off and protecting sensor 22.

A more detailed explanation of the initial condition is as follows. The plus input to comparator U110 under initial conditions is held at zero because capacitor C131 is discharged. The voltage on capacitor C131 rises after the initial condition. But the initial condition is necessary for the plus input to U110 to be low to supply a logic level low state signal back through resistor R130 which causes the constant current to flow into the oil level sensor 22. The junction of the oil level sensor 22 and the collector of Q105 during this initial condition must be above the plus input to U110. So at the initial conditions and shortly thereafter, when the plus input to U110 charges up towards Vcc, the voltage at the negative input stays above the voltage on C131 which holds the output of U110 low. A failure is sensed when the negative input to U110 falls down below the charging voltage on capacitor C131 at the positive input and this can only occur if the oil level sensor is out of oil and sinks to ground the output current of transistor Q105 at its collector.

The function of the oil level sensor 22 dictates that if it is in a fluid such as oil, it is held at a relatively low temperature. Its impedance is high due to the fact that the self-heating of the energized sensor is being dissipated by the oil itself. If the sensor comes out of the oil, then it no longer can dissipate that heat and therefore the temperature of the sensor rises due to its self-heating. It is that self-heating that causes the impedance of the sensor to go very low and ultimately short out the output of transistor Q105 even though you are supplying the same amount of current.

The feedback action of comparator U110 driving the constant current source is a feature of the circuit that helps increase the life of the sensor. As the voltage across the sensor drops, this means that its impedance is low and that it is sensing a high temperature, as well as generating a high temperature. The circuit turns off the current by changing the state of comparator U110, the output that is driving the constant current source through resistor R130. The shut off of transistor Q105 is a shut off of the current to the sensor 22 which allows it to cool. This ultimately extends the life of the oil level sensor by preventing overheating.

It will be appreciated by those skilled in the art that the circuit described herein, with different resistor values, can be used to excite a negative temperature coefficient sensor drive such as a thermistor.

While the invention has been particularly shown and described with reference to a preferred embodiment, it will be understood by those skilled in the art that various changes in form and details therein may be made without departing from the spirit and scope of the invention.

What is claimed is:

1. A fluid level sensor circuit comprising:
   relay means to supply power to the circuit;
   a fluid level sensor which employs semiconductive material which, over a temperature range, exhibits a predetermined varying resistance which is governed by a negative temperature coefficient over at least part of the temperature range;
   constant current means connected to the relay means and connected to supply a constant current to the fluid level sensor, the constant current means comprising;
   a transistor to pump current out of its collector to the fluid level sensor;
   an emitter resistor connected between the relay means and the emitter of the transistor; and
   two diodes connected in series between the relay means and the base of the transistor whereby the voltage across the emitter resistor is held to one diode drop and the current through the emitter resistor is held constant;
   reference voltage means;
   a signal representative of the fluid level sensor output;
   comparator means to compare the reference voltage means to the signal representative of the fluid level sensor output and to generate an output signal; and
   feedback means to feed the output signal back to the constant current source whereby the condition of the output signal determines when to energize and de-energize the constant current means; the feedback means comprising:
   a resistor connected between the output of the comparator and the base of the transistor whereby the voltage at the base is: pulled down towards ground when the output of the comparator is low, thereby turning the transistor on, and pulled up towards the start signal generating means voltage when the output of the comparator is high, thereby turning the transistor off.

2. The fluid level sensor circuit of claim 1 wherein the reference voltage means comprises:
   a supply voltage;
   a resistor connected between the supply voltage and the plus input to the comparator; and
   a capacitor connected between the plus input to the comparator and ground whereby the initial voltage at the plus input to the comparator is zero when the circuit is first energized and then is increased towards the value of the supply voltage as the capacitor charges.

3. The fluid level sensor circuit of claim 2 wherein the signal representative of the fluid level sensor output comprises:
   a resistor divider network connected between the collector of the transistor and ground,
   the resistor divider network which is connected to the negative input of the comparator and which presents the negative input to the comparator with a preselected voltage level being affected by the changing resistance of the fluid level sensor such that at very high temperatures, when the sensor imposes a law impedance back to the transistor, the resistor divider network voltage is pulled down below the preselected voltage level at the plus input to the comparator thereby causing the comparator to change states.

4. The fluid level sensor circuit of claim 3 wherein the fluid level sensor further comprises:
a device which employs the semiconductive material which over the temperature range also exhibits a peak electrical resistance at a predetermined temperature.

* * * * *